2 Sheets--Sheet 1

J. S. ELLIOTT.

Machines for Forming Building Blocks.

Reissued May 13, 1873.

No. 5,401.

Attest;
William W Swan
Edw. N. Dorr

Inventor;
J. S. Elliott
By his Attorney
Chas. F. Stansbury

J. S. ELLIOTT.

Machines for Forming Building Blocks.

No. 5,401. Reissued May 13, 1873.

Attest;
William W. Swan
Edw. W. Dorr

Inventor;
J. S. Elliott
By his Attorney
Chas. F. Ransbury

UNITED STATES PATENT OFFICE.

JOSIAH S. ELLIOTT, OF CHELSEA, MASSACHUSETTS, ASSIGNOR TO UNION STONE COMPANY.

IMPROVEMENT IN MACHINES FOR FORMING BUILDING-BLOCKS.

Specification forming part of Letters Patent No. 111,921, dated February 21, 1871; reissue No. 5,401, dated May 13, 1873; application filed December 24, 1872.

*To all whom it may concern:*

Be it known that I, JOSIAH S. ELLIOTT, formerly of Boston, now of Chelsea, Massachusetts, have invented certain improvements in machines for the manufacture of cemented and other plastic materials into grinding and polishing stones, building-blocks, and other forms, when in molds, of which the following is a specification:

My invention relates to three points—first, the application of a percussive force to the material in the mold for the purpose of forming, pressing, and condensing it; second, releasing the molded article safely and quickly from the mold; third, removing the article, when thus released, safely and quickly from the machine.

The general scope of the machine may be described as follows: The hopper having been filled with the prepared materials, the machine is set in motion, and a feeder containing enough of the materials to form the proposed article is carried under a ram. The bottom of the feeder is withdrawn, and the ram strikes a blow down through the materials, carrying them into a mold and partially condensing them. The blow is repeated and the ram is raised for a third blow. The feeder is carried back under the hopper to its original position, and a third blow is given by the ram, which then rises and is held still and firm, while the core is withdrawn downward and the mold is pressed upward against the face of the ram, which pushes out the molded article upon a table carried under it, upon which the article is received and removed to the front of the machine, the whole process being automatic and repeated indefinitely, and the machine in regular and continuous motion.

Figure 1:
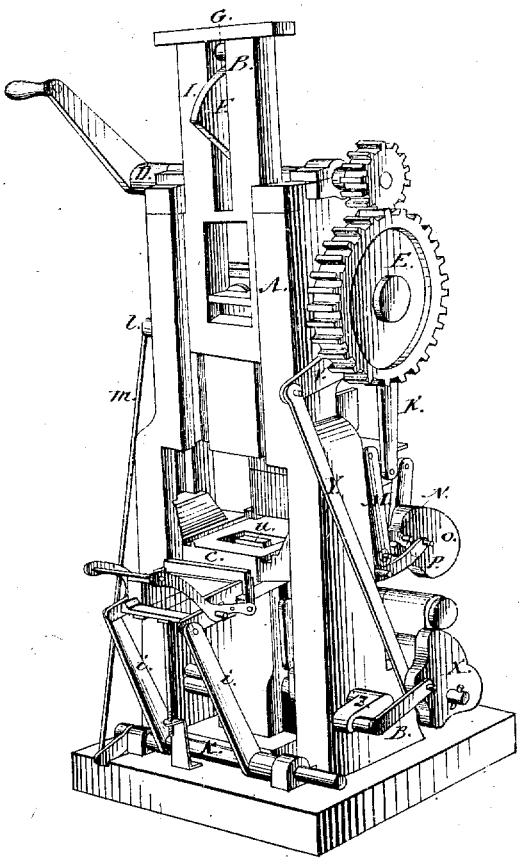
Figure 2:
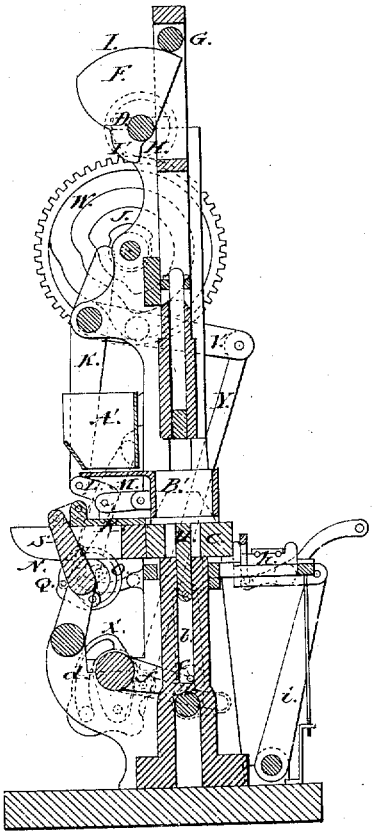
Figure 3:
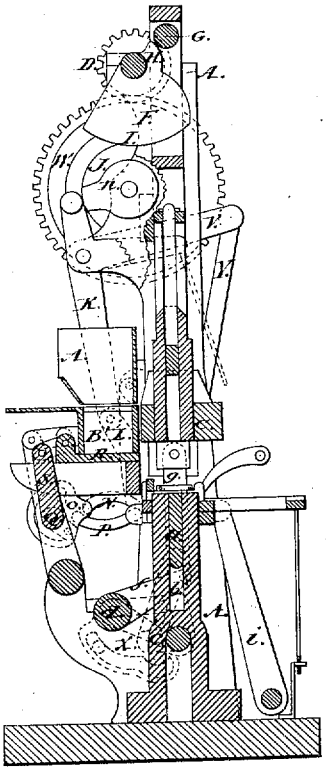
Figure 5:
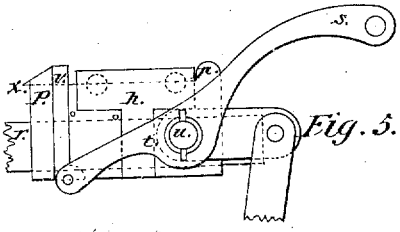
Figure 4:
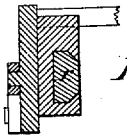

Figure 1 is a perspective view of the whole machine. Fig. 2 is a cross-vertical section of it ready to strike the first blow. Fig. 3 is a cross-vertical section of it after the final blow, the molded article being out of the mold upon the table. Fig. 5 is a side elevation of the carriage enlarged. Fig. 4 is a cross-section of the same.

The machine is of iron and steel or other metal, and may be of any size adapted to the work to be performed.

A is a frame. B is a hammer or ram, the face of which strikes upon the material in the mold C to form and compress it.

To raise and release the ram so as to give repeated blows, and also to retain the ram in its elevated position long enough to remove the molded article from the machine is the first point.

*Mode of Operation.*

The hopper A′ being filled, the feeder B′ is moved under the ram by the cam J in the large wheel, which moves the lever K which is connected by the link L with the lever M, which through the link N moves the cam O, which is connected with the frame A by the link P. The cam O is pivoted on the crank upon the crank-shaft Q, which moves the feeder forward. The movement continues in the same direction, turning the crank upward, and draws out the bottom R of the feeder ready for the blow by means of the arm S attached to the crank-shaft Q. The cam J in the large wheel moving now concentric with it, the feeder remains at rest long enough for the ram to strike two blows through it, forcing the materials into the mold, and long enough for the ram to be raised to its greatest height. The bottom of the feeder is now carried under it again by reversing the lever K by means of the cam J in the large wheel, and the same motion withdraws the feeder to its first position. The ram now gives a third and final blow as this machine is geared, and is partially raised, as elsewhere described.

As shown in the drawing, in this machine, instead of the cylinder-cam I have heretofore used to operate the ram, a cam is employed which acts from the center of its shaft toward its periphery, or what may be termed a cam. Such a cam lifts to much greater advantage, as it may be placed directly under, or nearly under, the weight to be lifted; and the greatest advantage of leverage is obtained by placing the shaft of the cam, as shown in the drawing, substantially under the weight to be lifted, and so that the distance from the center of the shaft to the roller or part of the ram acted upon does not vary substantially from the distance the hammer or ram falls.

The means by which the blows are given may be further described as follows: The power being applied to the shaft D, the cam F, which is fast to it, is carried upward inside the open space in the ram till the cam presents its straight side and releases the ram, which falls and gives the blow. The cam continues its motion, and in like manner a second blow is given. The motion still continues while the arc I, which is concentric with the shaft D, passes the roller G, and the feeder is withdrawn, as described above. The arc I having passed over the roller G, the third blow is given; and the cam F continues its motion till its short curve H engages the roller G and slightly raises the ram, which remains still while the arc I′ passes the roller.

While the ram thus remains still, the molded article is removed by the means now to be described, to wit: The core U is now withdrawn from the mold by means of the lever V, operated by the large cam W in the large wheel. The lever V is connected with the cam X by the rod Y. The cam X moves the crank Z by means of the link *a*, and the core, being connected with the crank-shaft, is moved downward by means of the links *b b* and cranks *c c*. The mold is now pressed upward against the face of the ram by the continued motion of the cam W in the large wheel, operating on the cam X, which is pivoted to the crank on the shaft *d*. On said shaft D are two arms, *f f*, attached to the mold by the links *g g*, and by means of this arrangement the mold is carried up against the face of the ram, which is firmly held at rest by the cam F, and the molded article forced out downward upon the table carried under it, by the arrangement next to be described. The table *h* rests upon a carriage, moving upon slides, by means of the arms *i i*, Fig. 1, attached to the shaft *k*, which is connected with the right-angle lever *l* by the rod *m*, the lever *l* having a roll working against the cam *n*, operated by the large wheel E, moved by the shaft D. As the mold rises the table is carried under it by the above arrangement, and remains until the article is forced down upon it by the device already described, when the carriage is withdrawn by means of a counter-weight, *o*, upon the end of shaft *k*, not shown in the drawing.

The operation being now complete, the hopper is filled without stopping the machine, and the whole process is repeated indefinitely.

The carriage is shown in Figs. 4 and 5, and the means by which it is moved has been already described. I will now describe the carriage itself. The table *h* is covered by a movable board, upon which the molded article is received and removed. This table rests upon a carriage, *p p*, Figs. 4 and 5, which moves upon slides, *r*, which are fixed to the frame of the machine. The table is pivoted to the levers *s s* at *t′*, and the levers are pivoted to the carriage at *u*. The bar or scraper *v* is also pivoted to the lower ends of the levers *s s*. After the carriage has run under the molded article to receive it, the table is raised by means of the levers *s s* against the bottom of the molded article, to receive it as it is pushed out of the mold by the ram, as before described. One object in thus receiving it is to prevent injury to it by its falling, and thus preserve it in form, materials for artificial stone being usually soft when molded, and requiring time to harden. The scraper *v* is also raised by the same motion of the levers *s s*, and, being pivoted further from the fulcrum *u*, is raised higher than the table behind the molded article, and, as the carriage is withdrawn, secures the removal of the article, which often adheres to the face of the ram, and retains it upon the table. Attached to the scraper *v* are guides, *x*, which, as the carriage moves under the mold, hold down the scraper so that it does not strike the side of the mold, but passes under it.

What I claim as my invention, and desire to secure by Letters Patent, is—

1. The machine herein shown and described for manufacturing artificial stone, consisting of the ram B, mould C, feeder B′, core *u*, and off-bearing table *h*, constructed, combined, and operating as set forth.

2. The combination herein shown, of the ram B, reciprocating feeder B′, movable mold C, and off-bearing table *h*, with their connecting and operating mechanism, as herein set forth.

3. The combination and arrangement of the mold C, shaft *d*, cams W, and their connections, as herein shown and described.

4. The arrangement of cams W and X, shaft *d*, and core *u*, with their connections, as herein shown and described.

5. The combination of the lever *s* and the pivots *u* and *t*, with the table *h* and the scraper *v*, as and for the purposes described.

6. In an artificial-stone machine, the combination, with the ram, of a cam acting directly thereon to lift and release the same, as herein substantially described.

J. S. ELLIOTT.

Witnesses:
H. FARNAM SMITH,
WILLIAM W. SWAN.